(12) United States Patent
Benouali et al.

(10) Patent No.: US 11,572,100 B2
(45) Date of Patent: Feb. 7, 2023

(54) REINFORCING ELEMENT

(71) Applicant: SIKA TECHNOLOGY AG, Baar (CH)

(72) Inventors: Hakim Benouali, Watermael-Boitsfort (BE); Patrick Cauchie, Rebecq (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 401 days.

(21) Appl. No.: 16/815,173

(22) Filed: Mar. 11, 2020

(65) Prior Publication Data

US 2020/0298910 A1 Sep. 24, 2020

(30) Foreign Application Priority Data

Mar. 19, 2019 (EP) ..................... 19163913

(51) Int. Cl.
*B62D 21/02* (2006.01)
*B62D 21/11* (2006.01)
*B62D 21/16* (2006.01)
*B62D 27/02* (2006.01)

(52) U.S. Cl.
CPC ............. *B62D 21/02* (2013.01); *B62D 21/11* (2013.01); *B62D 21/16* (2013.01); *B62D 27/02* (2013.01)

(58) Field of Classification Search
CPC ...... B62D 21/02; B62D 21/16; B62D 29/002; B62D 27/02; B29C 44/12; B29C 44/1276; B29C 44/128
See application file for complete search history.

(56) References Cited

U.S. PATENT DOCUMENTS

| 4,610,836 | A | * | 9/1986 | Wycech | ............... | B29C 44/386 |
| | | | | | | 156/196 |
| 4,695,343 | A | * | 9/1987 | Wycech | ............... | B62D 29/002 |
| | | | | | | 156/196 |
| 4,732,806 | A | * | 3/1988 | Wycech | ............... | B29C 44/386 |
| | | | | | | 428/68 |
| 5,266,133 | A | | 11/1993 | Hanley et al. | | |
| 5,373,027 | A | | 12/1994 | Hanley et al. | | |
| 6,387,470 | B1 | | 5/2002 | Chang et al. | | |

(Continued)

FOREIGN PATENT DOCUMENTS

| AU | 2013209351 A1 * | 8/2013 | ............. B29C 65/54 |
| DE | 10 2013 015883 A1 | 3/2015 | |

(Continued)

OTHER PUBLICATIONS

Sep. 5, 2019 Search Report issued in European Patent Application No. 19 16 3913.

*Primary Examiner* — Paul N Dickson
*Assistant Examiner* — Matthew D Lee
(74) *Attorney, Agent, or Firm* — Oliff PLC

(57) ABSTRACT

A reinforcing element for reinforcing structural elements in vehicles includes: a support having at least one reservoir, which has an outlet opening; an adhesive, which is arranged in the reservoir; and a dispensing element having a separating element and a propulsion element; wherein, when the propulsion element is actuated, the separating element is moved through the reservoir, with the result that the adhesive is dispensed from the reservoir through the outlet opening.

14 Claims, 5 Drawing Sheets

(56) References Cited

U.S. PATENT DOCUMENTS

2004/0255546 A1* 12/2004 Sophiea ............... B62D 29/002
                                                        52/741.1
2009/0220737 A1*  9/2009 Kraushaar ............ B29C 44/18
                                                        428/167
2015/0352930 A1* 12/2015 Belpaire ................ E05D 5/02
                                                        428/101

FOREIGN PATENT DOCUMENTS

| EP | 1946995 A1 | * | 7/2008 | ............ B29C 65/54 |
| JP | 2005-319662 A | | 11/2005 | |
| JP | 2013035382 A | * | 2/2013 | ............ B29C 65/54 |
| WO | 2010/097120 A1 | | 9/2010 | |
| WO | 2018/192946 A1 | | 10/2018 | |

* cited by examiner

REINFORCING ELEMENT

The present invention relates to a reinforcing element for reinforcing structural elements in vehicles, and to a system of a reinforced structural element having a structural element and a reinforcing element arranged therein.

Construction elements such as, for example, bodies and/or chassis frames of transportation and conveyance means, in particular of aquatic or terrestrial vehicles or of aircraft, in many instances have structures having cavities in order for lightweight constructions to be enabled. However, these cavities cause a wide variety of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Sealing elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1. The body 10 herein has various structures having cavities such as, for example, pillars 14 and supports or stays 12, respectively. Such structural elements 12, 14 having cavities are usually sealed or reinforced, respectively, using sealing and/or reinforcing elements 16.

FIG. 2 schematically illustrates a known concept for reinforcing such structural elements having cavities in motor vehicles. FIG. 2 herein shows a reinforcing element 16 in a structural element 12, 14 prior to an expansion of an expandable material 13. In this example, the expandable material 13 is arranged on surfaces of a support 11, which are arranged in the vicinity of the structural element 12, 14. In this exemplary embodiment, the support 11 has an M- or W-shaped cross section. A stiffness of the support 11 is thereby increased.

A surface of the support 11 which in each case faces an inner side of the structural element 12, 14 typically has a chessboard shape. In this case, the connecting material or the expandable material 13 can in each case be arranged only on surfaces which are arranged in the vicinity of the structural element 12, 14.

The disadvantage with such known reinforcing elements or systems or similar elements or systems is that the expansion of the expandable material leads to weakening of the mechanical stability of the system. This is of great significance in regions of crash-relevant structures, for example, since a maximum possible mechanical stability is desirable for such applications.

The invention is therefore based on the object of making available an improved reinforcing element which has improved mechanical stability. Moreover, it should be possible to install the reinforcing element according to the invention in vehicles in a simple and efficient way.

This object is achieved by a reinforcing element for reinforcing structural elements in vehicles, said reinforcing element comprising: a support having at least one reservoir wherein the reservoir has at least one outlet opening; an adhesive, which is arranged in the reservoir; and at least one dispensing element having a separating element and a propulsion element, wherein the separating element is arranged in the reservoir and separates the adhesive from the propulsion element, and wherein the separating element is arranged substantially opposite the outlet opening; wherein, when the propulsion element is actuated, the separating element is moved through the reservoir, with the result that the adhesive is dispensed from the reservoir through the outlet opening.

This solution has the advantage that it enables the use of an adhesive which does not have to be expanded in order to bridge a distance between the support and the structural element. It is thus possible to use adhesives which lead to a higher mechanical stability of the reinforced system. The arrangement of the adhesive in a reservoir furthermore makes the reinforcing element simple to handle. The reinforcing element can therefore be transported and manipulated easily without unwanted contact with the adhesive being made during this process.

One key concept of the present invention is that, through the provision of a dispensing element, a mechanism is made available which can dispense the adhesive from the reservoir and introduce it into a desired position of use between the support and the structural element. Since the dispensing element can be configured to be activated by increased temperature, for example, the reinforcing element proposed here can be used in exactly the same way in the process of producing vehicles as was the case with conventional reinforcing elements. Thus, there is no need for any adaptations to the vehicle production process.

When the propulsion element is actuated, the adhesive is dispensed from the reservoir through the outlet opening and introduced into a region between the support and the structural element in order to bond the reinforcing element adhesively to the structural element.

In one exemplary embodiment, the reservoir is arranged in an interior of the support.

Such an arrangement of the reservoir has the advantage that the adhesive is thereby protected in the best possible way during transport or during handling of the reinforcing element. Such an arrangement of the reservoir in the interior of the support furthermore offers the advantage that, as a result, it is possible to obtain a large number of external surfaces or walls of the support by means of which the reinforcing element can be adhesively bonded to the structural element. The larger an adhesive bonding surface between the reinforcing element and the structural element, the better a mechanical stability of the overall system can be improved.

In one exemplary embodiment, a direction of movement of the separating element is orthogonal with respect to a longitudinal axis of the support.

Such an alignment of the reservoir in the support has proven advantageous because it enables the adhesive to be dispensed as efficiently as possible into the desired regions, which typically form walls or outer surfaces of the support which extend along the longitudinal axis of the support.

In one exemplary embodiment, the reservoir has a substantially constant cross section along the direction of movement of the separating element.

In this case, the cross section of the reservoir can change slightly (e.g. become larger or smaller) along the direction of movement of the separating element, especially if the support is produced by an injection moulding method. In order to be able to remove the support from the injection mould, it is often necessary to provide the walls of the reservoir with a draft.

In one exemplary development, the constant cross section of the reservoir is square or rectangular or polygonal or oval or round or irregularly shaped.

In one exemplary embodiment, the support has between 1 and 20, or between 2 and 20, or between 3 and 20 reservoirs.

Depending on the size of the reinforcing element, it may be advantageous to provide more than one reservoir. For example, more reservoirs can be used for larger reinforcing elements than for smaller reinforcing elements.

The support may consist of any desired materials. Preferred materials are plastics materials, in particular polyurethanes, polyamides, polyesters, and polyolefins, preferably high-temperature-resistant polymers such as poly(phenylene ether), polysulphones, or polyether sulphones, which are in particular also foamed; metals, in particular aluminium and steel; or grown organic materials, in particular wood or other (densified) fibrous materials, or glass-type or ceramic materials; especially also foamed materials of this type;

or arbitrary combinations of said materials. Polyamide, in particular polyamide 6, polyamide 6.6, polyamide 11, polyamide 12 or a mixture thereof, is particularly preferably used. Combinations with fibres such as, for example, glass fibres or carbon fibres, are also possible.

Furthermore, the support may have any desired construction and any desired structure. It may be solid, hollow, or foamed, or have a grid-like structure, for example. The surface of the support may typically be smooth, rough, or structured.

In one exemplary embodiment the separating element is of rigid design.

A rigid design of the separating element has the advantage that, as a result, the propulsion element can also act non-uniformly on the separating element in order to dispense the adhesive from the reservoir.

In one exemplary embodiment, the separating element is formed from plastic or from metal or from a mixture of plastic and metal.

In one exemplary embodiment, the separating element is substantially flat.

In one exemplary embodiment, the separating element has a thickness, measured along the direction of movement of the separating element, of 0.5 to 5 mm, preferably of 1 to 4 mm, particularly preferably of 1.5 to 3 mm.

In an alternative embodiment, the separating element is of flexible design.

Such a flexible design of the separating element may be sufficient, for example, when the propulsion element is configured in such a way that a force of the propulsion element acts uniformly on the surface of the separating element.

In one exemplary embodiment, the flexible separating element is designed as a film.

In one exemplary refinement, the film is formed from metal, in particular aluminium, or from a polymeric plastic, especially Teflon.

In one exemplary embodiment, the film has a thickness, measured along the direction of movement of the separating element, of 0.005 to 0.50 mm, preferably of 0.01 to 0.40 mm, preferably of 0.05 to 0.30 mm, particularly preferably of 0.10 to 0.25 mm.

In one exemplary embodiment, the propulsion element comprises an expandable material.

The use of such expandable materials has the advantage that it is thereby possible to use a reliable heat-induced system to exert a substantially uniform force on the separating element.

Suitable expandable materials are marketed by Sika Corp., USA, for example under the SikaBaffle® 240, SikaBaffle® 250 or SikaBaffle® 255 brand, and are described in U.S. Pat. Nos. 5,266,133 and 5,373,027.

In one exemplary embodiment, the expandable material has an expansion rate of at least 1500% or of at least 1800% or of at least 2000% or of at least 2200%.

The use of expandable materials as a propulsion element with such expansion rates has the advantage that, as a result, little material or weight has to be used to be able to ensure a correspondingly necessary propulsion force.

In an alternative embodiment, the propulsion element comprises a compression spring.

Such compression springs have the advantage, in particular, that the propulsion force thereof can be selected or set precisely. Thus, for example, it is possible to configure a compression spring for a reinforcing element in such a way that, in an unheated state, the force on the separating element is too low to dispense the still viscous adhesive from the reservoir but that, when the temperature is increased, a viscosity of the adhesive falls in such a way that the same force of the compression spring is sufficient to dispense the now less viscous adhesive from the reservoir.

In this way, a robust system for dispensing the adhesive from the reservoir can be made available, this being dependent on the viscosity of the adhesive, which, in turn, depends directly on a temperature of the adhesive.

In another alternative embodiment, the propulsion element comprises a shape memory material.

Once again, a shape memory material can be configured in such a way that, at a certain temperature, a change in the shape or a movement of the material is triggered, thereby making it possible to generate a propulsion force. Many different variant embodiments are conceivable here. For example, use can be made of shape memory materials which act directly on the separating element by means of their change in shape, or it is possible, for example, to use shape memory materials which act on the separating element via a mechanism. For example, a shape memory wire can be operatively connected by mechanical means to the separating element in such a way that, when there is an increase in temperature, the shape memory wire contracts, thereby initiating a force on the separating element.

Adhesive

The adhesive composition described below is an exemplary adhesive of the kind that can be used in the context of this invention.

A one-component thermosetting epoxy composition as per Table 1 was produced.

TABLE 1

Starting materials used.

| Raw materials | Parts by weight |
| --- | --- |
| Liquid epoxy resin, D.E.R. 331 (bisphenol A diglycidyl ether), Dow | 50 |
| Polyester polyol, Dynacol 7380, Degussa AG, Germany | 5 |
| Reactive diluent, hexanediol glycidyl ether, Denacol EX-212, Nagase America | 1 |
| Toughness improver D-1 | 34 |
| Curing agent, dicyandiamide | 4.78 |

TABLE 1-continued

Starting materials used.

| Raw materials | Parts by weight |
|---|---|
| Accelerator, substituted urea | 0.22 |
| Fumed silica | 5 |

Preparation of a Toughness Improver ("D-1")

150 g of poly-THF 2000 (OH number 57 mg/g KOH) and 150 of Liquiflex H (OH number 46 mg/g KOH) were dried under vacuum at 105° C. for 30 minutes. Once the temperature had been reduced to 90° C., 61.5 g of IPDI and 0.14 g of dibutyltin dilaurate were added. The reaction was carried out under vacuum at 90° C. until the NCO content was constant at 3.10% after 2.0 h (calculated NCO content: 3.15%). Subsequently, 96.1 g of cardanol were added as blocking agent. Stirring was continued at 105° C. under vacuum until it was no longer possible to detect any free NCO. The product was used as such as toughness improver D-1. The following raw materials were used for the purpose:

Poly-THF 2000 (difunctional polybutylene glycol)
(OH equivalent weight = about 1000 g/OH equivalent), BASF
Liquiflex H (hydroxyl-terminated polybutadiene)
(OH equivalent weight = about 1230 g/OH equivalent), Krahn
Isophorone diisocyanate (="IPDI"), Evonik
Cardolite NC-700 (cardanol, meta-substituted
alkenylmonophenol), Cardolite Production of Master Batch The polyester polyol was mixed at about 40° C. above its softening point of 77° C. (about 100-140° C.) for about 30 minutes with liquid epoxy resin until a clear mixture (about 33% by weight of polyester polyol based on the total weight of the masterbatch) was formed. The masterbatch was then cooled down to about 100° C.

Production of the Thermosetting One-Component Epoxy Composition:

The other components of the epoxy composition were mixed to give a homogeneous material, preferably at temperatures of about 50-90° C. As soon as the mixture was homogeneous, the masterbatch was added in liquid form (temperature of the masterbatch 100° C.) and immediately mixed in.

The one-component thermosetting epoxy composition was injected at a temperature of 60° C. and at an injection rate of 50 ml/min.

In one exemplary embodiment, the adhesive when activated is substantially non-expandable.

In an alternative embodiment, the adhesive when activated has an expansion rate of −15% to +15% or of −10% to +10% or of −5% to +5%.

An exemplary material of a substantially non-expandable adhesive of this kind is available under the trade name SikaPower®.

In one exemplary embodiment, the adhesive has an elastic modulus of at least 500 MPa or of at least 1000 MPa or of at least 1500 MPa or of at least 2000 MPa after curing.

In one exemplary embodiment, the adhesive is configured as injection-mouldable material.

This has the advantage that, as a result, both the support and the adhesive can be produced in an injection moulding process, e.g. in a two-component injection moulding process.

In one exemplary embodiment, the reinforcing element furthermore comprises an expandable element, which is arranged on the support.

In an exemplary development, the expandable element is arranged in such a way that a flowing motion of the adhesive is restricted by expansion of the expandable element.

In one exemplary embodiment, the expandable element has an expansion rate of between 50% and 500%, or between 100% and 400%, or between 100% and 300%.

The use of an additional expandable element of this kind has the advantage that a region in which the adhesive is after being dispensed from the reservoir can be defined more accurately.

Suitable materials for expandable elements of this kind are marketed under the trade name SikaReinforcer® 941 by Sika Corp., USA. This adhesive is described in U.S. Pat. No. 6,387,470.

In one exemplary embodiment, the expandable element has an expansion rate of at least 500% or of at least 1000% or of at least 1500% or of at least 2000%.

Moreover, a system is proposed here which comprises a structural element having a cavity, and a reinforcing element as per the above description, wherein the reinforcing element is arranged in the cavity of the structural element.

Details and advantages of the invention will be described below on the basis of exemplary embodiments and with reference to schematic drawings, in which.

A first variant embodiment of a reinforcing element 16 or of a system 1 of a reinforced structural element 12, 14 is illustrated in FIGS. 3a to 4d. In this exemplary embodiment, an expandable material is used as a propulsion element 6.

Figure 1:
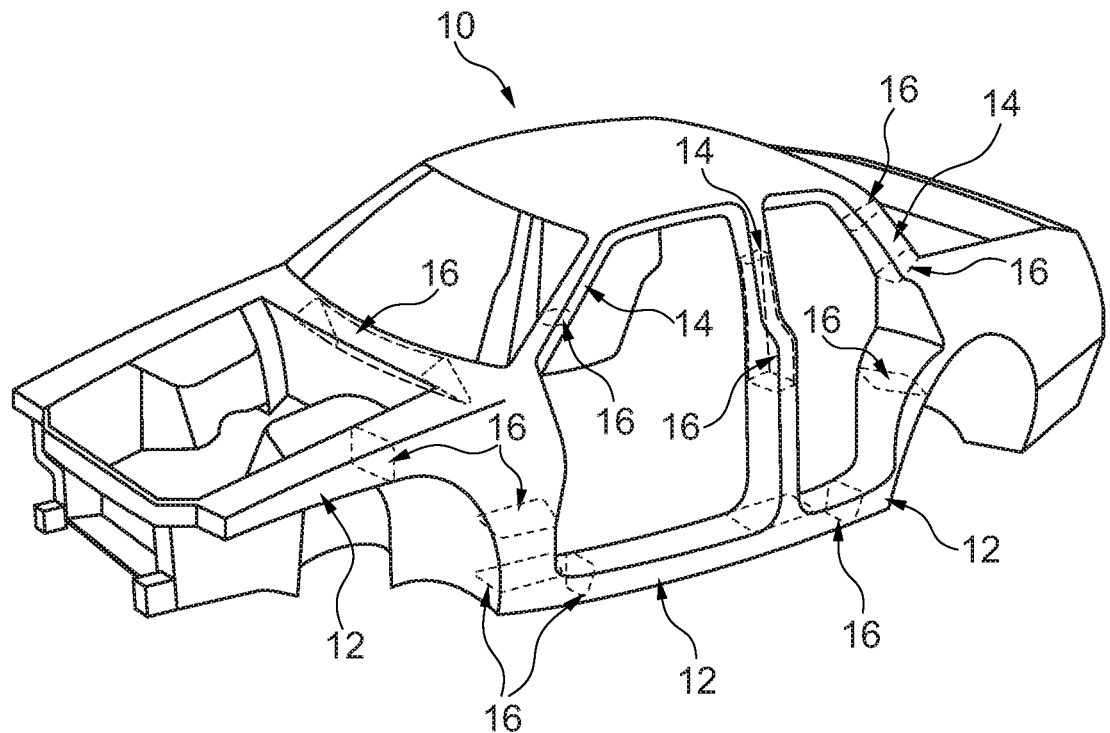
FIG. 1 shows an exemplary illustration of a body.
Figure 2:
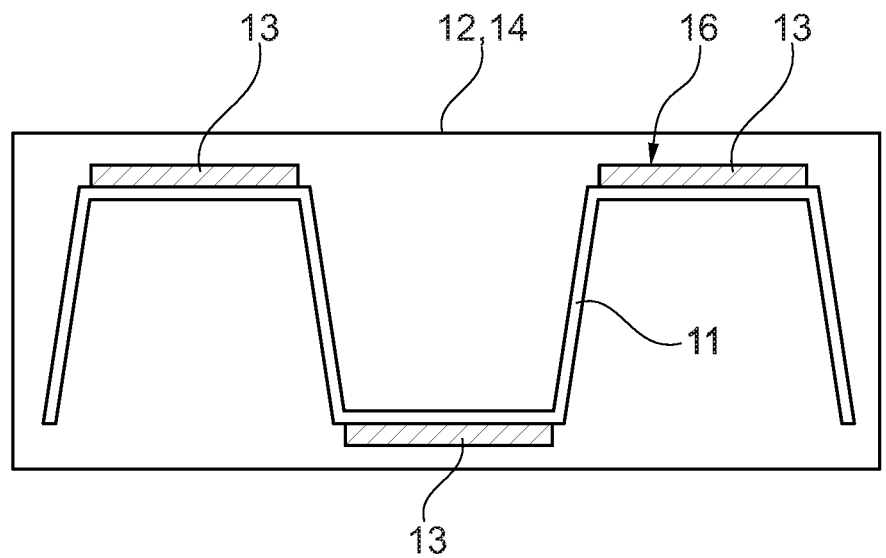
FIG. 2 shows an exemplary illustration of a reinforcing element in a structural element according to the prior art.
Figure 3A:
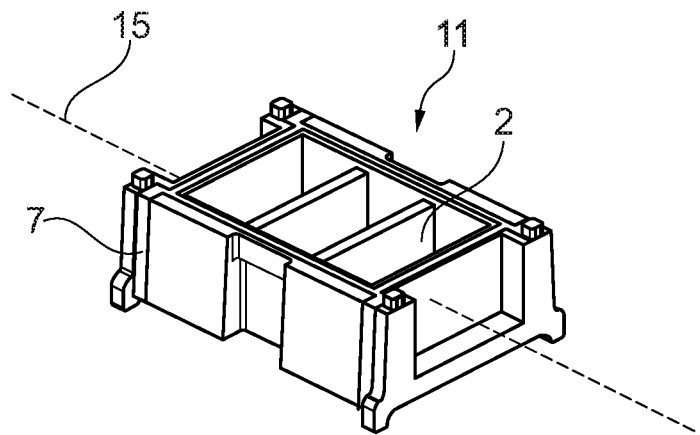
FIGS. 3a to 3e show schematic illustrations of an exemplary reinforcing element.

The support 11 is first of all illustrated in FIG. 3a. In this example, the support 11 has three reservoirs 2, which are arranged adjacent to one another along a longitudinal axis 15 of the support 11. Moreover, an expandable element 7 is arranged on the support 11.

Figure 3B:
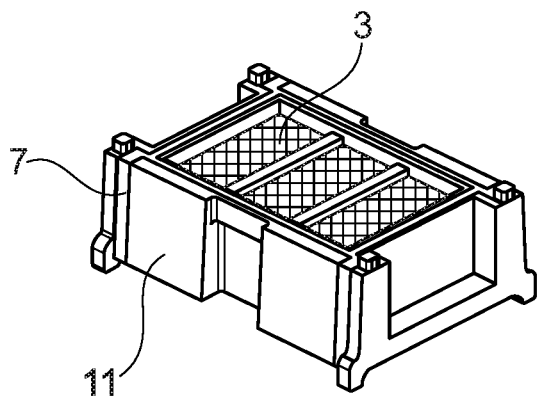

The same support 11 is then illustrated in FIG. 3b, although the reservoirs 2 are then filled with adhesive 3.

Figure 3D:
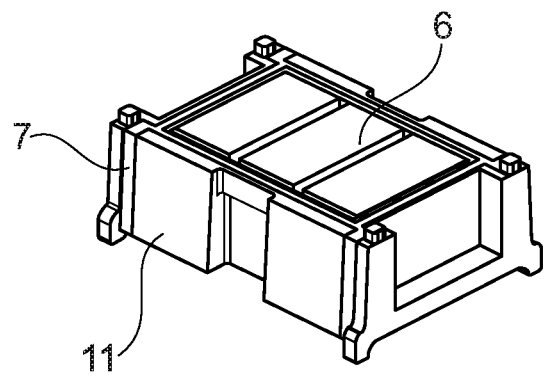
Figure 3C:
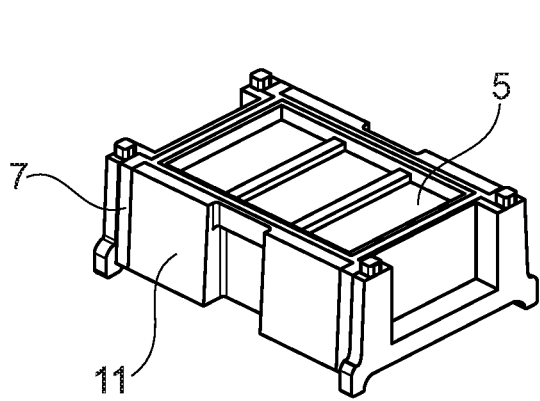

In FIG. 3c, a separating element 5 is arranged on each reservoir 2 filled with adhesive 3. In FIG. 3d, the propulsion element 6, which in this exemplary embodiment comprises expandable material, is arranged on the separating elements 5. In this variant embodiment, the expandable material is distributed in a sheet-like manner over all three reservoirs 2.

Figure 3E:
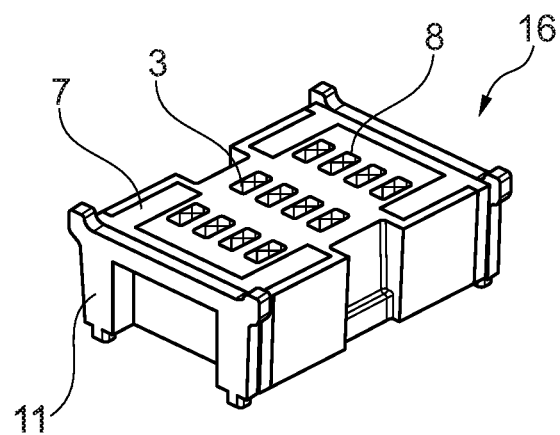

In FIG. 3e, the same reinforcing element 16 as in FIG. 3d is illustrated, but from a different angle of view. In this illustration, the outlet openings 8 of the reservoirs 2 are visible. The outlet openings 8 are each situated substantially opposite the separating elements 5, thus enabling the adhesive 3 to be dispensed through the outlet openings 8 by a movement of the separating elements 5 through the reservoirs 2.

Figure 4A:
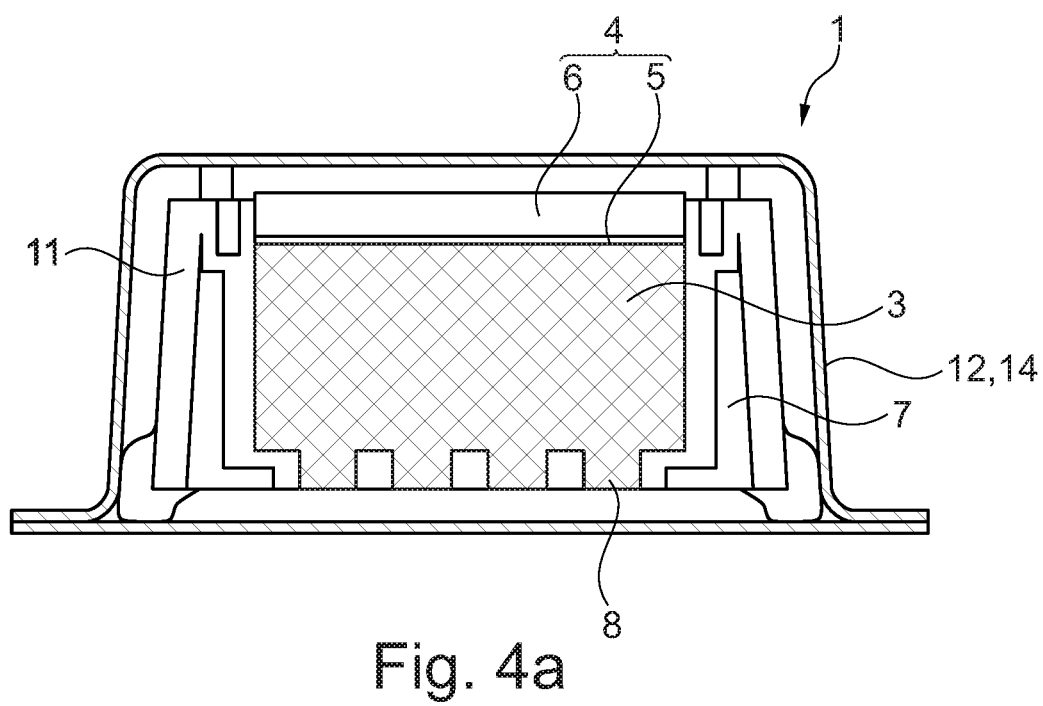
FIGS. 4a and 4b show schematic illustrations of an exemplary system of a reinforced structural element.
Figure 4B:
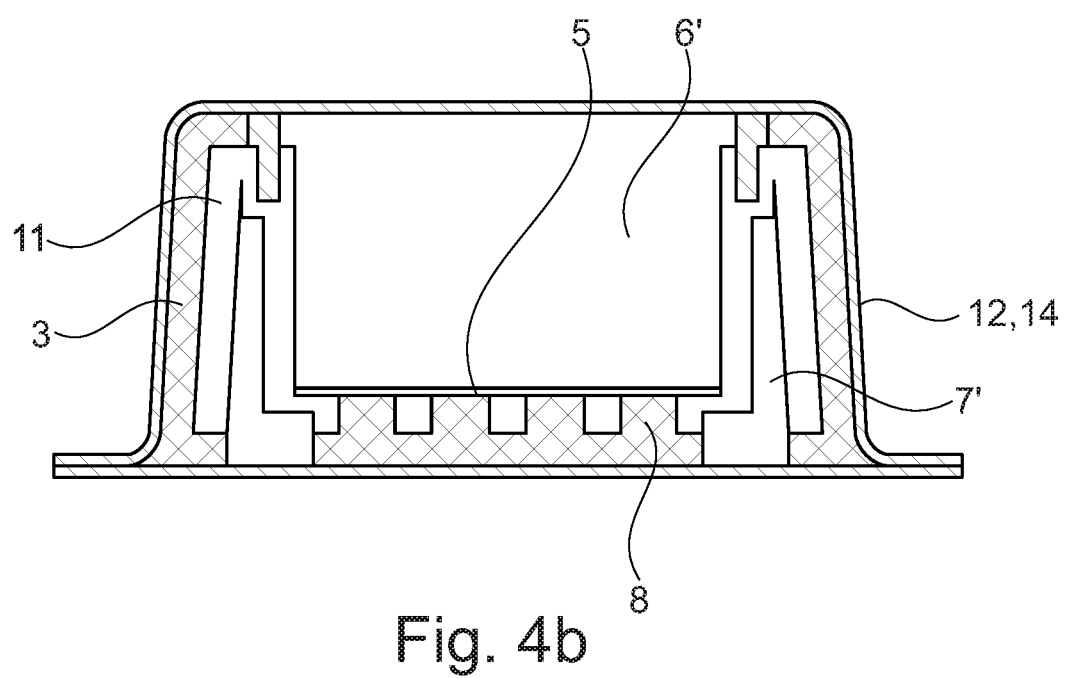
Figure 5A:
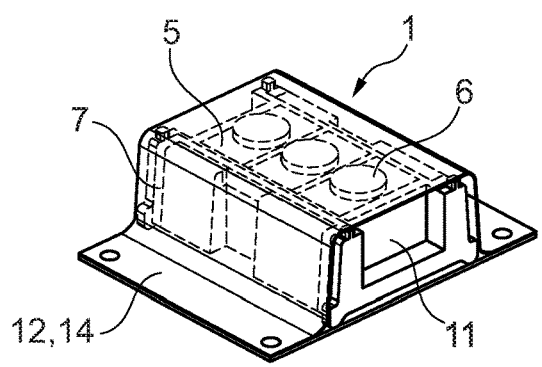
FIGS. 5a to 5d show schematic illustrations of an exemplary system of a reinforced reinforcing element.
Figure 5B:
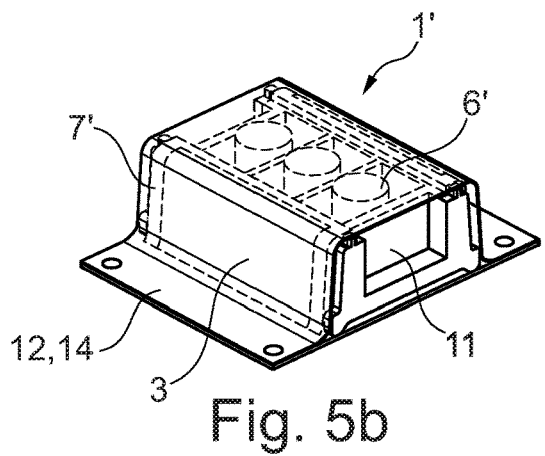
Figure 5C:
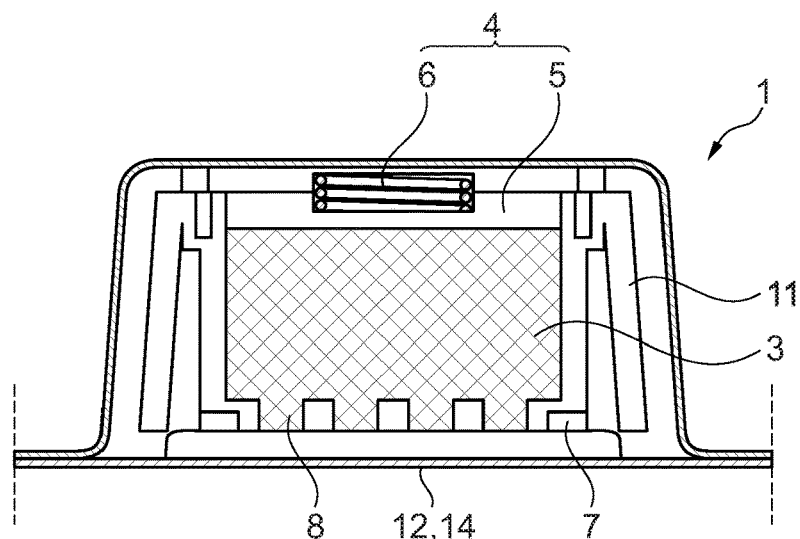
Figure 5D:
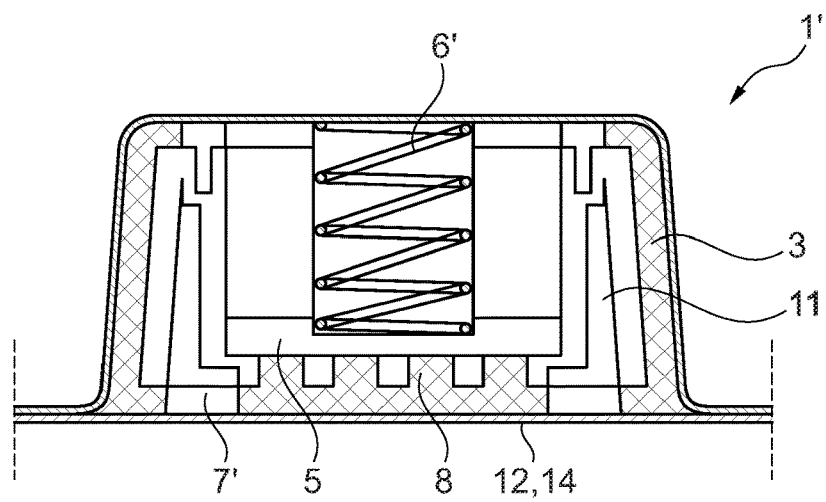
Figure 6A:
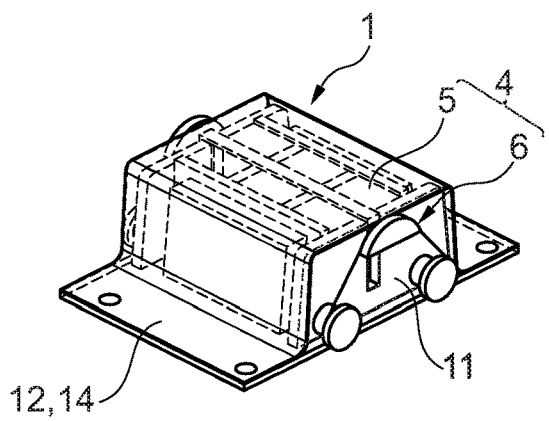
FIGS. 6a to 6d show schematic illustrations of an exemplary system of a reinforced structural element.
Figure 6B:
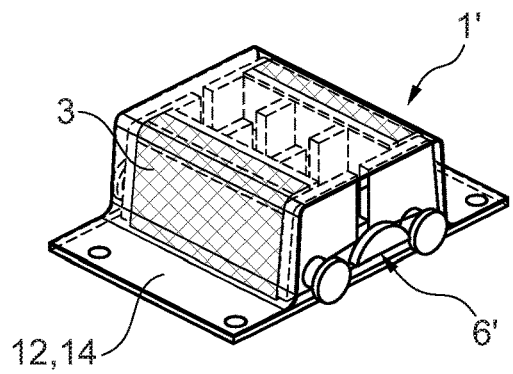
Figure 6C:
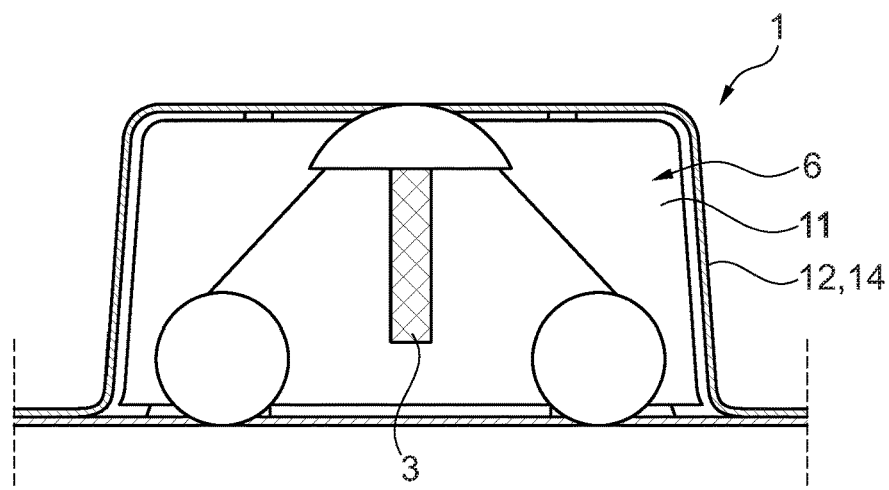
Figure 6D:
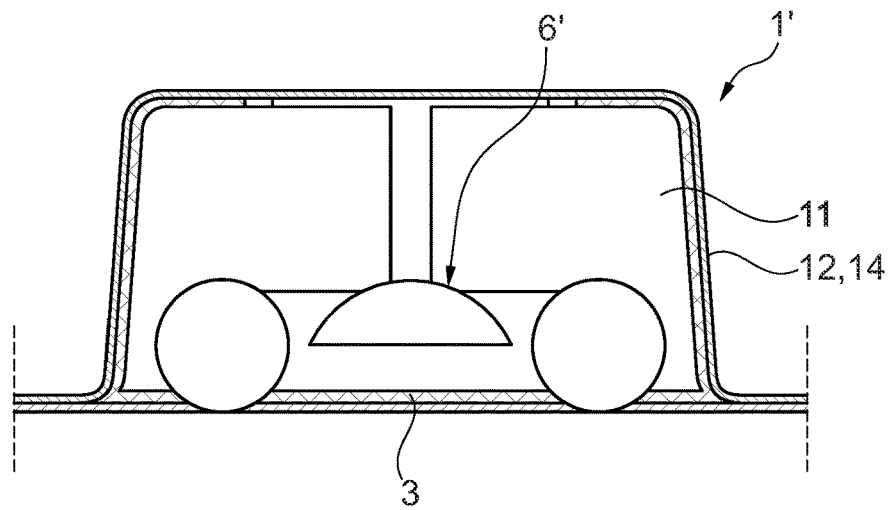

In FIGS. 4a and 4b, the reinforcing element 16 according to FIGS. 3d and 3e is arranged in a structural element 12, 14. In FIGS. 4a and 4b, the system 1 is shown in a sectional illustration. FIG. 4a shows the system 1 in a state before activation of the propulsion element, and FIG. 4b shows the system 1' after activation of the propulsion element 6, i.e. with the activated propulsion element 6'. The separating element 5 and the propulsion element 6 together form the dispensing element 4.

From these two illustrations in FIGS. 4a and 4b, it can be seen how the adhesive 3 is dispensed from the reservoir 2 by the dispensing element if the propulsion element 6 is activated and the separating element 5 is moved through the reservoir 2, with the result that the adhesive 3 is dispensed from the outlet openings 8 and brought into a region between the support 11 and the structural element 12, 14, where the adhesive 3 can bond the reinforcing element 16 adhesively to the structural element 12, 14.

Another exemplary embodiment of a system 1 having a reinforcing element 16 in a structural element 12, 14 is illustrated in FIGS. 5a to 5d. In contrast to the illustrative embodiment shown in FIGS. 3a to 4d, the propulsion element 6 in this exemplary embodiment comprises compression springs.

Another alternative exemplary embodiment of a system 1 and of a reinforcing element 16 in a structural element 12, 14 is illustrated in FIGS. 6a to 6d. In this exemplary embodiment, the propulsion element 6 comprises a shape memory material.

In this specific exemplary embodiment, the shape memory material is designed as a shape memory wire, which is stretched over a movable hoop. If the temperature is then increased, the shape memory wire shortens, thereby moving the hoop downwards. The movement of the hoop also moves the separating elements 5 downwards, with the result that they perform a movement through the reservoir and thereby dispense the adhesive 3 from the reservoir 2.

LIST OF REFERENCE SIGNS

1 System
2 Reservoir
3 Adhesive
4 Dispensing element
5 Separating element
6 Propulsion element
7 Expandable element
8 Outlet opening
10 Body
11 Support
12 Structural element
13 Expandable adhesive
14 Structural element
15 Longitudinal axis
16 Reinforcing element

The invention claimed is:

1. A reinforcing element for reinforcing structural elements in vehicles, said reinforcing element comprising:
a support having at least one reservoir, wherein the reservoir has at least one outlet opening;
an adhesive, which is arranged in the reservoir;
at least one expandable element, which is arranged on the support; and
at least one dispensing element having a separating element and a propulsion element, wherein the separating element is arranged in the reservoir and separates the adhesive from the propulsion element, and wherein the separating element is arranged substantially opposite the outlet opening;
wherein, when the propulsion element is actuated, the separating element is moved through the reservoir, with the result that the adhesive is dispensed from the reservoir through the outlet opening.

2. The reinforcing element according to claim 1, wherein the reservoir is arranged in an interior of the support, and/or wherein a direction of movement of the separating element is orthogonal with respect to a longitudinal axis of the support.

3. The reinforcing element according to claim 1, wherein the reservoir has a substantially constant cross section along the direction of movement of the separating element.

4. The reinforcing element according to claim 3, wherein the constant cross section of the reservoir is square or rectangular or polygonal or oval or round or irregularly shaped.

5. The reinforcing element according to claim 1, wherein the separating element is flexible, and/or wherein the separating element is designed as a film.

6. The reinforcing element according to claim 1, wherein the separating element is rigid, and/or wherein the separating element is formed from plastic, and/or wherein the separating element is substantially flat.

7. The reinforcing element according to claim 1, wherein the propulsion element comprises expandable material.

8. The reinforcing element according to claim 7, wherein the expandable material has an expansion rate of at least 500% or of at least 1000% or of at least 1500% or of at least 2000%.

9. The reinforcing element according to claim 1, wherein the propulsion element comprises a compression spring.

10. The reinforcing element according to claim 1, wherein the propulsion element comprises a shape memory material.

11. The reinforcing element according to claim 1, wherein the adhesive when activated is substantially non-expandable.

12. The reinforcing element according to claim 1, wherein the adhesive is configured as injection-mouldable material.

13. The reinforcing element according to claim 1, wherein the expandable element is arranged in such a way that a flowing motion of the adhesive is restricted by expansion of the expandable element.

14. A system of a reinforced structural element comprising
a structural element having a cavity; and
a reinforcing element according to claim 1;
wherein the reinforcing element is arranged in the cavity of the structural element.

* * * * *